United States Patent [19]

Cerreta

[11] Patent Number: 4,835,950
[45] Date of Patent: Jun. 6, 1989

[54] FILAMENT TRIMMER INCLUDING A BLOWER

[76] Inventor: Jonathan D. Cerreta, 5637 W. Poinsetta, Glendale, Ariz. 85304

[21] Appl. No.: 226,935

[22] Filed: Aug. 1, 1988

[51] Int. Cl.$^4$ ............................................. A01D 34/63
[52] U.S. Cl. ...................................... 56/12.8; 56/13.4
[58] Field of Search ................ 56/12.7, 12.8, 13.4, 56/295; 30/276, 347

[56] References Cited

U.S. PATENT DOCUMENTS

| | | | |
|---|---|---|---|
| 2,777,271 | 1/1957 | Sutton | 56/25.4 |
| 2,779,146 | 1/1957 | Mitchell et al. | 56/25.4 |
| 4,187,577 | 2/1980 | Hansen et al. | 15/328 |
| 4,189,905 | 2/1980 | Frantello | 56/295 |
| 4,227,280 | 10/1980 | Comer | 15/330 |
| 4,242,794 | 1/1981 | Peterson | 30/122 |
| 4,290,257 | 9/1981 | Frantello | 56/12.7 |
| 4,335,567 | 6/1982 | Comer | 56/12.7 |
| 4,362,007 | 12/1982 | Kennedy et al. | 56/295 |
| 4,604,067 | 8/1986 | Roberts | 440/49 |
| 4,715,123 | 12/1987 | John et al. | 30/276 |

Primary Examiner—Jerome W. Massie
Assistant Examiner—Matthew Smith
Attorney, Agent, or Firm—Warren F. B. Lindsley

[57] ABSTRACT

A blower attachment for rotation with a filament line spool of a conventional filament line trimmer which attachment is provided with at least a pair of blades that are selectively extendable from the spool for providing a blower function.

14 Claims, 2 Drawing Sheets

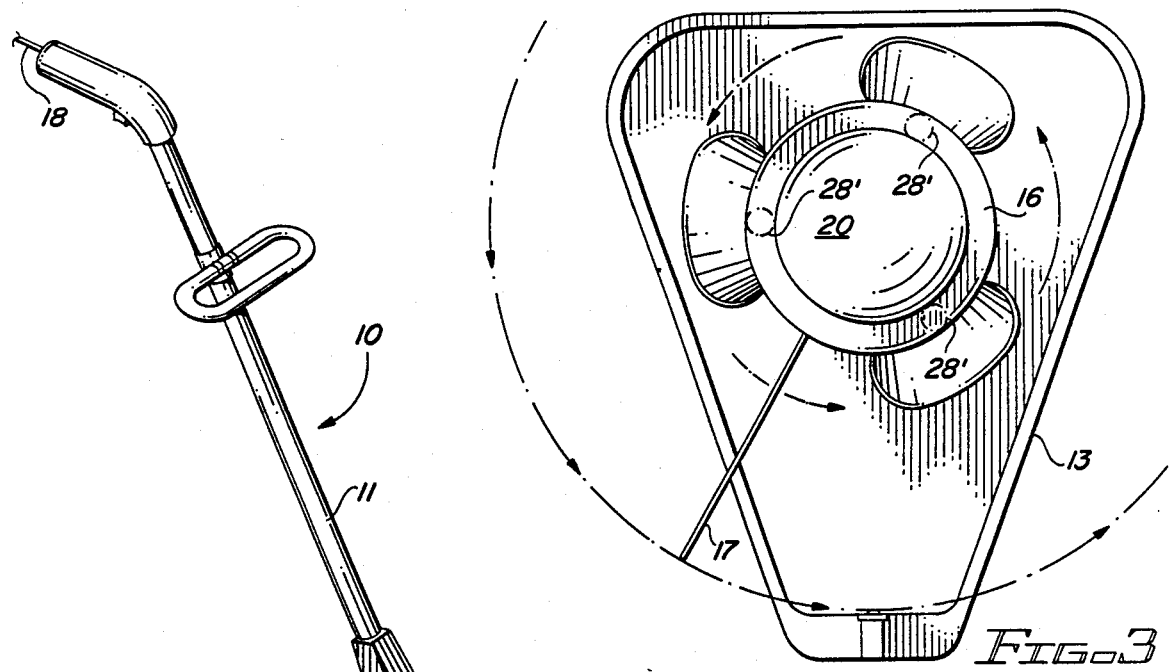
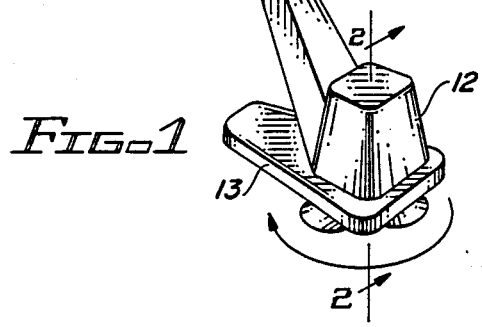
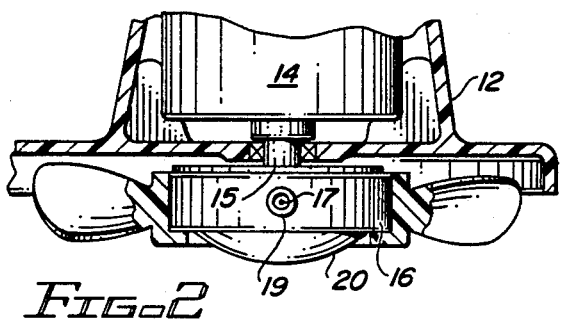
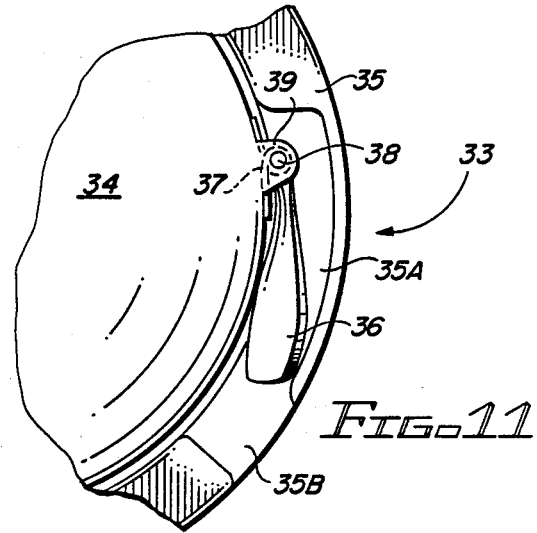
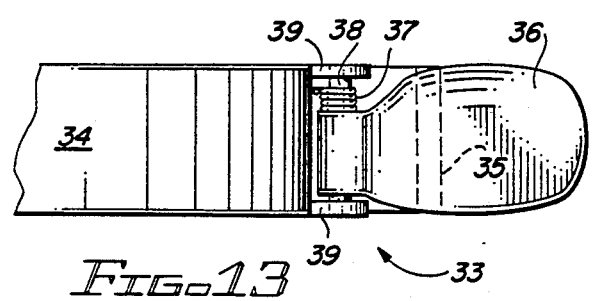
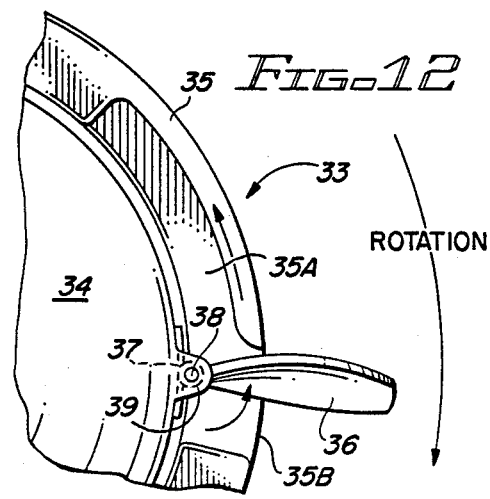

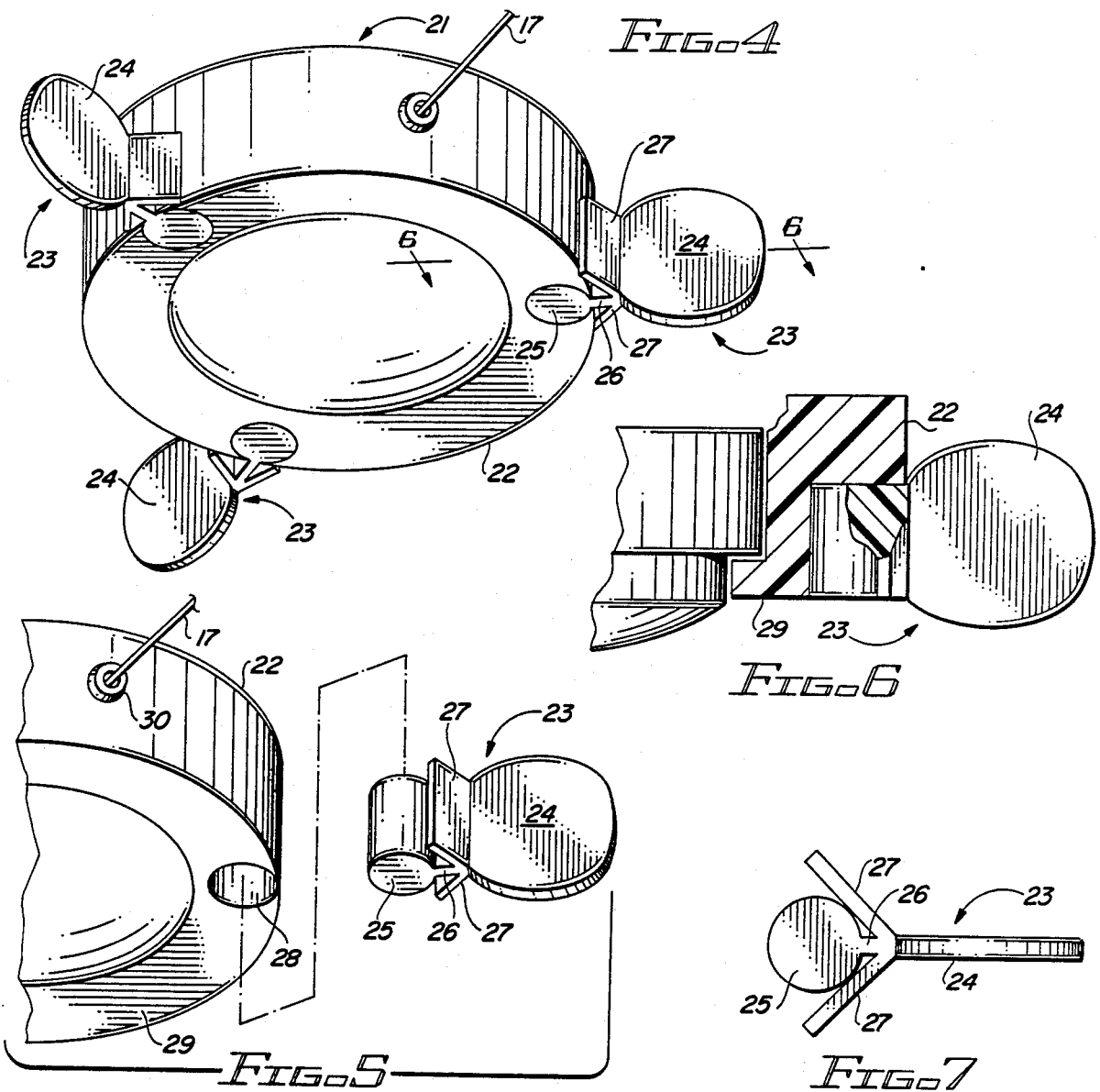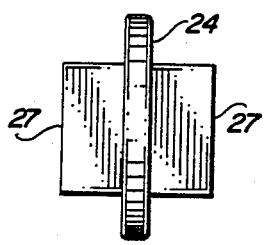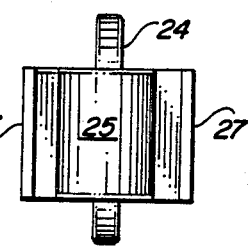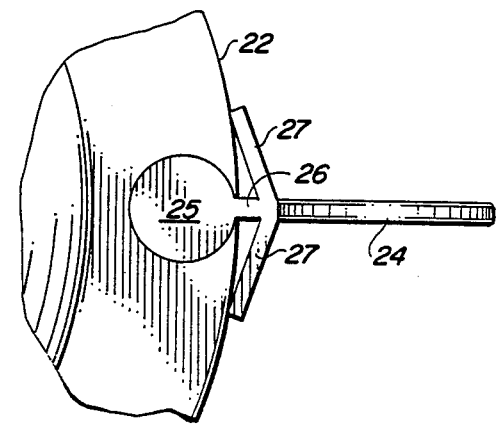

FILAMENT TRIMMER INCLUDING A BLOWER

BACKGROUND OF THE INVENTION

This invention relates to filament trimmers and, more particularly, to an attachment for conventional filament line trimmers which converts the trimmers into an apparatus for removal of grass clippings generated during the trimming operation.

Conventional filament line trimmers are known in the art and comprise an electric motor or gas engine that rotatably drives a filament line at a relatively high rate of speed to cut grass and is particularly useful in trimming about the edges of swimming pools, patios, driveways, walkways and the like. The conventional line trimmer typically includes a spool of cutting filament which is attached to the shaft of the rotating electric motor or gas engine.

Prior to this invention, there existed no simple way of converting a filament trimmer into a dual functional apparatus which not only clips the grass, but also removes the grass clippings from the serviced area without extensive modification of the trimmer. Thus, the unsightly appearance left by clippings generated by the operation of a filament line trimmer is eliminated and the necessary operator time to collect and remove the clippings is greatly reduced.

DESCRIPTION OF THE PRIOR ART

U.S. Pat. No. 4,189,905 discloses an attachment for the drive shaft of rotary lawnmowers. The attachment replaces the normal metal blade, and comprises an outer cylindrical body having air vanes extending therefrom. A flexible cutting line extends through a tube and an aperture into the body of the device. The vanes assist in blowing grass from beneath the mower.

U.S. Pat. Nos. 4,242,794; 4,227,280 and 4,187,577 all show blower attachments for filament type trimmers. All of these patents require that the filament trimmer be removed and the fan or impeller be installed before converting from a filament trimmer to a blower.

Other U.S. Pat. Nos. of general interest are listed below: 4,604,067, 4,335,567, 2,777,271, 2,779,146, None of these are believed to be anticipatory individually or in combination of the claimed invention.

SUMMARY OF THE INVENTION

In accordance with the claimed invention, a new and improved fan blade attachment is provided for filament line trimmers which may be added to the rotating shaft of the trimmer, such as, for example, to the outer periphery of the filament line spool, for providing a blower function upon rotation thereof for removal of the clippings and debris generated by the filament line trimmer.

It is, therefore, one object of this invention to provide a blower attachment for detachably mounting on or around the filament line spool of a filament line trimmer.

Another object of this invention is to provide a band for surrounding and adhering to the outer periphery of a filament line trimmer which has at least a pair of resilient blades extending laterally therefrom.

A further object of this invention is to selectively provide an endless resilient band for surrounding and adhering to the outer periphery of the filament line spool of a filament line trimmer without modification of the trimmer.

A still further object of this invention is to provide an inexpensively manufactured resilient ring that may be slipped over the outer periphery of the filament line spool of a filament line trimmer which ring has resilient blades extending laterally therefrom that may be detachably secured thereto.

A still further object of this invention is to provide a lightweight, safe in operation blower attachment that may be easily detachably mounted to conventional flexible line grass or weed trimmers without modification of the trimmer.

A still further object of this invention is to provide a band for mounting around the filament line spool of a filament line trimmer that comprises blower blades that retract and remain in the band when not in use, but are releasable for extending laterally from the band under centrifugal force when in use.

Further objects and advantages of this invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a perspective view of a filament line trimmer with a blower attachment and embodying the invention;

FIG. 2 is a cross-sectional view of FIG. 1 taken along the line 2—2 with the blower attachment comprising a detachably mounted ring or band;

FIG. 3 is a bottom view of the trimming head of the filament line trimmer shown in FIG. 1 with blower blades detachably mounted to the spool housing the filament line;

FIG. 4 is a perspective view of the blower attachment shown in FIGS. 1 and 2;

FIG. 5 is an enlarged exploded perspective view showing the detachable feature of one of the blower blades of the ring or band shown in FIGS. 2 and 4;

FIG. 6 is a cross-sectional view of FIG. 4 taken along the line 6—6 showing a sectional view of one of the blades inserted in the ring of the blower attachment and mounted on the filament line trimmer;

FIG. 7 is a top view of the detachable blade shown in FIG. 5;

FIG. 8 is a bottom view of FIG. 5 with the attachable blade in place in the ring of the blower attachment;

FIG. 9 is a right end view of FIG. 7;

FIG. 10 is a left end view of FIG. 7;

FIG. 11 is a partial view of a modification of the blower attachment shown in FIG. 4 wherein a blade mounted on a spool of filament line is retractable into a ring selectively rotatable on the spool.

FIG. 12 is a view of the blower attachment shown in FIG. 11 with the blade in an extended position; and FIG. 13 is a vertical cross-sectional view of the bearing structure of the blade shown in FIGS. 11 and 12.

DESCRIPTION OF THE PREFERRED EMBODIMENTS

Referring more particularly to the drawings by characters of reference, FIGS. 1-3 disclose a conventional portable monofilament line trimmer 10 shown, for example, as being of an electric motor type comprising a handle 11 connected to a drive motor housing 12 having a lower flange 13. An electric motor 14 is mounted within housing 12 with its rotating shaft 15 extending into the area surrounded by flange 13 and attached to, for rotating therewith, a housing or spool 16 of a monofilament line 17. Electric motor 14 is connected to an electric cord 18 which extends through handle 11 for connection to a suitable source of electric power.

Filament line spool 16 is mounted on shaft 15 for rotating therewith a spool of monofilament line 17 housed therein. Spool 16 is provided with an aperture 19 therein through which the monofilament line 17 is fed outwardly thereof a predetermined distance for providing the trimming function of the device as well known in the art. A bump button 20 is attached to the bottom of housing 12 for use in automatically dispensing line 17 from its spool when needed, as well as providing a runner for moving the trimmer over the ground when in use.

In accordance with the claims of this invention, a blower attachment is provided which can be easily mounted to the conventional filament line trimmers to convert the trimmer into an apparatus for removal of the clippings and debris generated by its use. The clippings and debris are dispersed by blades detachably added to the rotating spool 16 of the filament line 17. These blades may be detachably mounted on a housing or spool 16 after a line trimming action, or they may be added to the housing and function during a filament line trimming function. Thus, the operator of the filament line trimmer is no longer faced with the unpleasant choice of either allowing the clippings and debris to remain, thereby leaving an unsightly appearance, or spending considerable time and labor in manually sweeping the clippings away.

As shown in FIGS. 2 and 4, the blower attachment may comprise an endless ring detachably mounted around spool 16 or it may comprise two or more blades detachably added to spool 16 as shown in FIG. 2.

The blower blades shown in FIG. 3 may be of the type shown in FIGS. 4-8, later described, but detachably added into slots or apertures in the outer periphery of spool 16 rather than to a separate ring or band as shown in FIG. 4.

As shown in FIG. 4, a blower attachment 21 comprising an endless ring or band 22 is suitably mounted around the outer periphery of housing or spool 16. This band, which may be, for example, formed of a resilient or nonyielding material, is provided with two or more blade assemblies 23 extending laterally therefrom, which are spaced apart about its outer periphery. The blade assemblies have working surfaces or blades 24 lying in planes extending laterally of the outer periphery of the band which may be, for example, disposed at an angle with the axis of shaft 15 of motor 14 such that the working surfaces are canted generally rearwardly with respect to the rotational direction of the movement of shaft 15.

As shown, particularly in FIGS. 5 and 6, the blade assemblies 23 each further comprise a cylindrical portion 25 interconnected by a web 26 to blade 24 so that the longitudinal axis of the cylindrical portion 25 and web 26 lie coplanar with blade 24. A pair of deflector flanges 27 lie one on each side of web 26, and angularly therewith, so as to overlie the outside periphery of band 22 when the blade and particularly its cylindrical portion 25 is inserted in cylindrical opening 28 spacedly positioned around the periphery of band 22.

As shown in FIGS. 5 and 6, openings 28 extend into the bottom surface 29 of band 22 a distance far enough to receive substantially the full length of cylindrical portion 25 of the blade assembly 23.

As noted from FIGS. 4 and 5, the monofilament line 17 extends through an aperture and collar arrangement 30 in band 22 as shown.

It should be noted that the blade assemblies 23 may be added to openings 28' formed in the periphery of spool 16, as heretofore described, and fall within the scope of the invention claimed herein.

FIGS. 11-13 disclose a further modification of the ring or band assembly disclosed in FIGS. 1-10, wherein a ring or band assembly 33 is mounted around a spool or housing 34 for a spool of monofilament line 17. The assembly comprises an endless ring or band 35 of a resilient or nonyielding material which is mounted for selective predetermined limited rotative movement around housing 34.

The band is provided with pockets 35A therein for housing spring biased movable blades 36 therein which blades, upon selective movement of band 35 relative to housing 34, cause the blades 36 to extend downwardly of pockets 35A through openings 35B.

Blades 36 are pivotally mounted on spool or housing 34 to extend outwardly thereof by means of a spring 37 mounted around a pin 38 journalled on a pair of ears 39 which are spacedly mounted around the periphery of housing 34.

Upon predetermined rotation of ring 35, the blades 36 may be exposed for blower purposes by spring bias or centrifugal force or retracted to their inactive positions in pocket 35A as so desired by the operator.

It should be known that FIGS. 11-13 are illustrative of only one way of utilizing retractable blower blades, and that other ways may be used to implement this function and still fall within the scope of this invention.

Although but a few embodiments of the present invention have been illustrated and described, it will be apparent to those skilled in the art that various changes and modifications may be made therein without departing from the spirit of the invention or the scope of the appended claims.

What is claimed is:

1. A blower attachment for use with a filament line trimmer which has a shaft and means for rotatably driving the shaft, the shaft further having means thereon for normally securing a filament line spool thereto, comprising:
   at least a pair of blades for detachably mounting around said spool for rotation therewith,
   said blades being extendable laterally therefrom,
   said blades when extended and upon rotation of said spool blowing air and the grass clippings and debris cut by said trimmer away from the trimmed area.

2. A blower attachment for use with a filament line trimmer which has a shaft and means for rotatably driving the shaft, the shaft further having means thereon for normally securing a filament line spool thereto, comprising:
   a band for fitting around said spool for rotation herewith,
   said band selectively extending at least a pair of blades laterally therefrom,
   said blades when extended and upon rotation of said band blowing air and the grass clippings and debris cut by said trimmer away from the trimmed area.

3. The blower attachment set forth in claim 2 wherein:

said blades are detachably mounted on said band.

4. The blower attachment set forth in claim 2 wherein:

said band is provided with at least a pair of spacedly arranged slots in its periphery, and said blades are provided with means for detachably engaging one with each of said slots to extend laterally therefrom.

5. The blower attachment set forth in claim 4 wherein:

said slots each comprise a cylindrical opening and said means comprises a cylindrical portion of said blades.

6. The blower attachment set forth in claim 5 wherein:

said blades each comprise a flat planar structure, and said cylindrical portion of each of said blades have a longitudinal axis which is coplanar with said flat planar structure of each of said blades.

7. The blower attachment set forth in claim 6 wherein:

said flat planar structure is formed of a resilient material.

8. The blower attachment set forth in claim 2 wherein:

said band comprises an endless configuration.

9. The blower attachment set forth in claim 2 wherein:

said blades are retractable into said band.

10. The blower attachment set forth in claim 2 wherein:

said blades are positionable within said band and are selectively movable to extend laterally outwardly from said band.

11. The blower attachment set forth in claim 2 wherein:

said blades are spring biased to an inactive position within said band and are selectively arranged to extend laterally outwardly from said band under centrifugal force upon rotation of the shape of the filament line trimmer.

12. The blower attachment set forth in claim 2 wherein:

said band is provided with an aperture for receiving therethrough the free end of the filament line extending from said spool.

13. The blower attachment set forth in claim 2 wherein:

said band has at least a pair of blades that are selectively extendable laterally therefrom.

14. A blower attachment for use with a filament line trimmer which has a shaft and means for rotatably driving the shaft, the shaft further having means thereon for normally securing a filament line spool thereto comprising:

a rotatably mounted housing for said spool, at least a pair of blades selectively extendable laterally outwardly from said housing, said blades when extended and upon rotation of said housing blowing air and the grass clippings and debris cut by said trimmer away from the trimmed area, and a ring for mounted around said housing for movement relative thereto, said ring being provided with pockets, each of which house one of said blades when in one position relative to said housing and expose said blades laterally of said housing when in another position relative to said housing.

* * * * *